US007016409B2

(12) United States Patent  
Unger

(10) Patent No.: US 7,016,409 B2  
(45) Date of Patent: Mar. 21, 2006

(54) APPARATUS AND METHOD FOR USE IN PROVIDING DYNAMIC BIT RATE ENCODING

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 106 days.

(21) Appl. No.: 10/712,696

(22) Filed: Nov. 12, 2003

(65) Prior Publication Data

US 2005/0100100 A1     May 12, 2005

(51) Int. Cl.
*H04N 7/12*     (2006.01)
(52) U.S. Cl. ................................. 375/240.02
(58) Field of Classification Search ........... 375/240.02; 348/14.1, 14.08, 14.13, 14.12; 455/3.06; 725/95–96; 358/426.03, 426.08
See application file for complete search history.

(56) References Cited

U.S. PATENT DOCUMENTS

| | | | |
|---|---|---|---|
| 4,790,015 A | | 12/1988 | Callens et al. |
| 5,559,798 A | | 9/1996 | Clarkson et al. |
| 5,617,145 A | | 4/1997 | Huang et al. |
| 5,638,371 A | | 6/1997 | Raychaudhuri et al. |
| 6,026,097 A | * | 2/2000 | Voois et al. ................. 370/468 |
| 6,091,777 A | * | 7/2000 | Guetz et al. ........... 375/240.11 |
| 6,532,562 B1 | * | 3/2003 | Chou et al. ................. 714/746 |
| 2002/0071052 A1 | * | 6/2002 | Itoh et al. ................. 348/384.1 |

OTHER PUBLICATIONS

Wu et al, "Dynamic bit rate conversion in multipoint video transcoding", International Conference on Image Processing, vol. 3, pp. 817-821, Oct. 1999.*
PCT/US04/38578-search rpt, May. 10, 2005, Gueta and Itoh, p. 4.

* cited by examiner

*Primary Examiner*—Vu Le
(74) *Attorney, Agent, or Firm*—Thomas F. Lebens; Fitch, Even, Tabin & Flannery

(57) ABSTRACT

An apparatus, system and method for use in for use in dynamically adjusting an encoder bit rate according to a determined available bandwidth for wirelessly communicating source data. A method detects a first available bandwidth, determines a first encoder bit rate according to the available bandwidth, encodes a signal at the first encoder bit rate, detects a change in the available bandwidth such that there is a second available bandwidth, determines a second encoder bit rate according to the second available bandwidth, and encodes the signal at the second encoder bit rate. Encoding the signal at the second encoder bit rate can include encoding a subsequent frame of the signal. The method can further wirelessly communicate the signal encoded at the first encoder bit rate in real-time and wirelessly communicate the signal encoded at the second encoder bit rate in real-time.

17 Claims, 5 Drawing Sheets

APPARATUS AND METHOD FOR USE IN PROVIDING DYNAMIC BIT RATE ENCODING

FIELD OF THE INVENTION

The present invention relates generally to dynamic bit rate allocation, and more particularly to dynamically allocating bit rate encoding according to time variant bandwidth.

BACKGROUND OF THE INVENTION

Each frame of video typically requires a large number of bits when recorded, converted and/or stored in a digital format. Further, video is often delivery at a rate of 30 frames per second. The large amount of digital data and the speed at which this data is delivered presents a large raw bandwidth requirement. Delivery of full content from broadcaster to customer is not practical. This drawback is overcome by compressing data through elimination of redundancies and other compression and encoding methods.

Many encoding models (e.g., MPEG) define and standardize decoding techniques, yet often do not restrict or define how encoders operate. Typically video is encoded to fixed bandwidth outputs with a constant bit rate (CBR), or encoded with a variable bit rate (VBR) where many bits are used for scenes with significant motion, and few bits for still scenes. For VBR there is still a target or maximum available bit rate specified for a given transport pipe. In operation, previous encoders are defined with either a CBR or VBR value, encoding begun, and the encoders are then left alone to produce an encoded output. The encoders continue to encode at the fixed encoding (CBR or VBR). Changes to an encoded bit rate typically includes stopping the encoder, redefining the parameters, reconfiguring the encoders to utilize the new parameters such that the encoders detect the new parameters and restarting the encoder with the new parameters.

In some applications, such as transmission over a wireless connection, the available bandwidth can change dynamically and suddenly. With CBR and VBR, the encoder continues to operate at the specified encoding bit rate regardless of the bandwidth capacity. If the bandwidth falls below a level that is required for the CBR or VBR content being pushed onto the communication link, data can be lost causing picture freezes and other discontinuities on a client display. Similarly, because encoders are started at a predefined bit rate and they continue to simply encode at that specified rate (CBR or VBR) without change, available bandwidth may be wasted when the encoded data does not occupy the entire bandwidth.

SUMMARY OF THE INVENTION

The present invention advantageously addresses the needs above as well as other needs through methods, apparatuses, and systems for use in dynamically adjusting an encoder bit rate according to a determined available bandwidth for wirelessly communicating source data. In some embodiments, a method is provided for use in dynamically adjusting a bit rate for encoding that detects a first available bandwidth, determines a first encoder bit rate according to the first available bandwidth, encodes a signal at the first encoder bit rate, detects a change in the available bandwidth such that there is a second available bandwidth, determines a second encoder bit rate according to the second available bandwidth, and encodes the signal at the second encoder bit rate. Encoding the signal at the second encoder bit rate can include encoding a subsequent frame of the signal. The method can further wirelessly communicate the signal encoded at the first encoder bit rate in real-time and wirelessly communicate the signal encoded at the second encoder bit rate in real-time.

Some embodiments provide a method for use in providing dynamically varied bit rate encoding. The method can comprise encoding a signal for wireless communication at a first encoding bit rate, detecting a first change in an available bandwidth envelope of a communication path, determining if the first change in the available bandwidth envelope exceeds a predefined threshold, determining an available bandwidth envelope of the first changed available bandwidth envelope, determining a second encoding bit rate according to the determined available bandwidth envelope that maintains a signal quality when the first change in the available bandwidth envelope exceeds the predefined threshold, and initiating the encoding of the signal at a subsequent frame with the second bit rate. The method can further determine a maximized bit rate that can be communicated within the determined available bandwidth envelope, and where the initiating of the encoding comprises initiating the encoding according to the maximized determined bit rate.

Some of these methods further comprise detecting a second change in the available bandwidth envelope, determining a second available bandwidth envelope according to the second change in the available bandwidth envelope, determining a third encoding bit rate according to the determined second available bandwidth envelope, encoding the signal at the third encoding bit rate, and wirelessly communicating the signal encoded at the third encoding bit rate.

Some alternative embodiments provide a wireless, multimedia system. These systems comprise a central controller that receives source data and wirelessly distributes at least a portion of the source data, where the central controller comprises: a dynamic, variable bit rate encoder; a transmitter coupled with the dynamic bit rate encoder, wherein the transmitter transmits at least the portion of the source data as encoded by the dynamic bit rate encoder; a control device coupled with the dynamic bit rate encoder, the control device determines an available bandwidth according to received statistics and determines an encoding bit rate according to the determined available bandwidth; and the control device instructs the dynamic bit rate encoder to encode at the determined encoding bit rate. The control device can further determine the available bandwidth and the encoding bit rate once every frame. Some embodiments further comprise a remote device wirelessly coupled with the central controller, wherein the central controller wirelessly distributes at least the portion of the source data to the remote device encoded at the determined encoding bit rate.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

The above needs are at least partially met through provision of methods, apparatuses, and systems for use in dynamically varying an encoding bit rate according to a determined available bandwidth as described in the following detailed description, particularly when studied in conjunction with the drawings, wherein.

Figure 1:
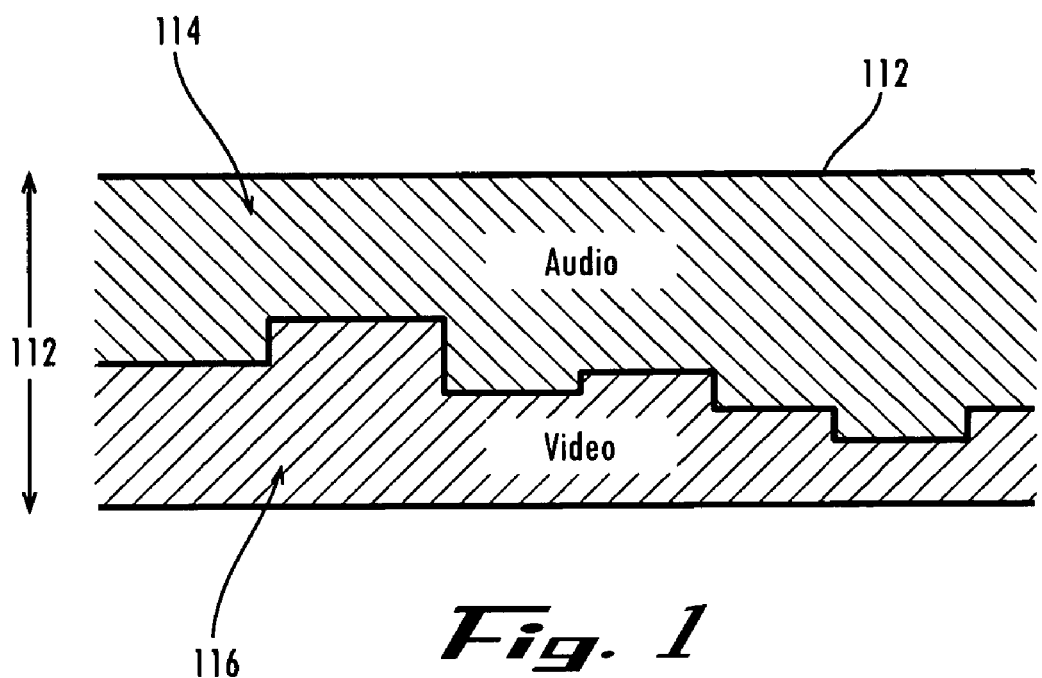
FIG. 1 depicts a simplified graphical representation of a fixed bandwidth.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

The present embodiments provide methods, apparatuses and systems for use in providing local multi-media distribution to remote multi-media devices. Further, the present embodiments provide for the dynamic allocation of bit rates in wirelessly communicating the multi-media signals to the remote multi-media devices. The bit rate is adjusted to fully take advantage of available bandwidth as the bandwidth varies.

Additionally, the present embodiments monitor an available bandwidth and adjust an encoding bit rate to better maximize the data throughput and/or signal quality. As a result, the present embodiments provide more accurate and better signal quality to the remote receiving device or devices. These embodiments further maximize the use of the available bandwidth. When a decrease in available bandwidth is detected, the present embodiments can dynamically decrease to encoding bit rate to reduce the amount of bits to be communicated. Further, some embodiments detect when the available bandwidth increases. As the bandwidth increases, these embodiments can increase the encoding bit rate to communicate more accurate, enhanced and/or additional data. Therefore, these embodiments dynamically adjust the bit rate to take full advantage of the detected available bandwidth as the bandwidth fluctuates.

It is common in wireless, multi-media systems, such as in-home, wireless, multi-media systems to experience fluctuations of the bandwidth during operation. For example, something (a human, a pet, or the like) can pass between the transmitting device and a receiving device. This may have an adverse affect on the available bandwidth that can be utilized in wirelessly communicating data. With prior systems, this diminished bandwidth can adversely affect the communication of signals because prior systems employ fixed bit rates. Because prior systems provide encoding at constant bit rates, the amount of encoded bits can exceed the available bandwidth, backlogging the data and/or adversely affecting the ultimately received signal. Previous systems utilize encoders that are typically controlled through a one time setup and go parameter, such as MPEG encoders. The previous encoders are issued a fixed bit rate parameter. Once this parameter is set, these encoders check this bit rate parameter once upon initiation and/or start up, set the encoding rate and continue to operate at that one fixed rate. Alternatively, the present embodiments detect the changes in bandwidth and dynamically adjust the bit rate to better maximize the use of the available bandwidth.

Some prior systems suggest they provide variable bit rates. These systems, however, do not dynamically adjust bit rates according to a detected available bandwidth envelope. For example, U.S. Pat. No. 5,617,145 to Huang et al. describes the utilization of a defined fixed bandwidth. The available bit rate of the fixed bandwidth is distributed between two data signals (audio and video). FIG. 1 depicts a simplified graphical representation of a fixed bandwidth 112 according to the Huang et al. patent. The available fixed bandwidth 112 is divided between an audio signal 114 and a video signal 116.

The Huang patent encodes the signals at fixed rates and determines, based on how much of the fixed bandwidth of a frame is allocated to the audio signal, how much of the encoded video signal is utilized for the remainder of the fixed bandwidth for that frame. For example, in a frame where there is minimal or no sound and/or noise, the audio signal can be significantly compression leaving extra unused bandwidth. An amount of encoded video signal is used to fill the fix bandwidth for that frame. Similarly, during a noisy scene there is a large amount of audio, taking a greater portion of the fixed bandwidth and reducing the amount of fixed bandwidth available for the encoded video. Huang et al. employs a constant bit rate that is divided between two signals, the audio and video.

Figure 2:
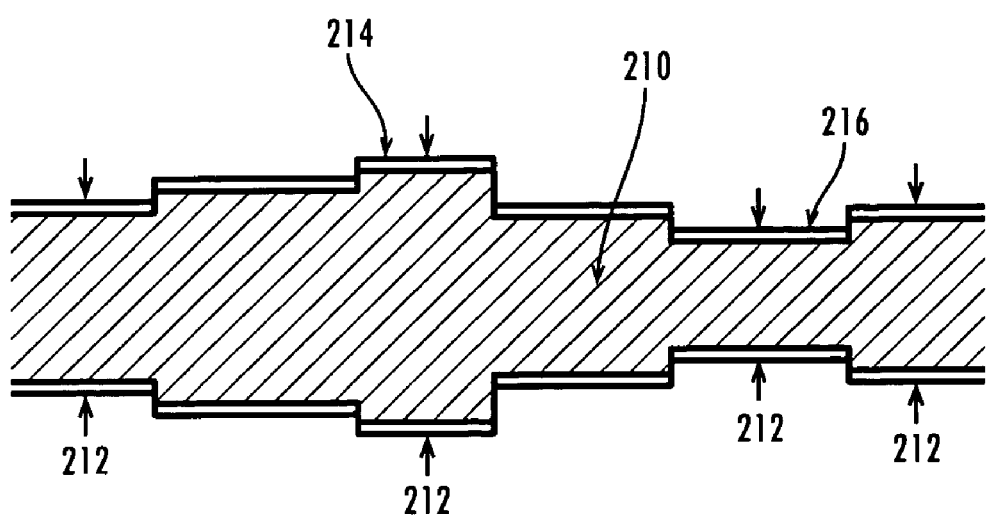
FIG. 2 depicts a simplified graphical representation of an example of a dynamic allocation of an encoded bit rate according to present embodiments as dictated by a measured available communication bandwidth envelope.

Present embodiments address a problem where the amount of bandwidth changes due to environmental or other factors. Alternatively, Huang et al. attempts to maximize the amount of data in the fixed and defined bandwidth. FIG. 2 depicts a simplified graphical representation of a bandwidth envelope 212 that varies over time and a dynamic allocation of an encoded bit rate 210 according to present embodiments. The encoded bit rate 210 is dynamically allocated according to a measured available communication bandwidth envelope 212 as the bandwidth fluctuates over time. During some periods of time, indicated for example by the reference numbers 214, the bandwidth is at a maximum. As such, the present embodiments provide a maximum encoding bit rate (indicated generally by reference number 216). Similarly, as the available bandwidth drops to a minimum, the present embodiments reduce the encoding bit rates to minimal levels.

The bandwidth can be defined for a single signal or can be split between two or more signals. When allocated between two or more signals, the bandwidth 212 can be equally split and/or split as defined by some weighting criteria. In some embodiments, one a first signal does not completely use the bandwidth allocated for that signal, a second signal can utilize the unused portion of the first signals allocated bandwidth. Further, encoding of each of the one or more signals is dynamically varied according to the measured bandwidth envelope 212.

Some multi-media systems employing encoders, such as person video recorders (e.g., Tivo™, ReplayTV™, DirecTV™ and other such recorders), can set an encoding rate. These encoding rates, however, are typically set once per recording and that single rate is used throughout the recording. For example, a personal video recording device may provide recordings at one of four possible quality levels (e.g., minimal memory to best quality). A user selects a record quality, and the personal video recorder can determine an amount of bandwidth to be used according to available memory and/or recording time. Once the bandwidth is determined, the personal video recorder sets a fixed encoding rate parameter. The encoder of the personal video recorder checks the rate parameter just prior to recording, and sets the encoder bit rate once. The rate is set and then unchanged until the program/recording is done. The encoders are set up once, and operate without external influence.

Alternatively, the present embodiments monitor an available bandwidth and adjust the encoding bit rates as the available bandwidth fluctuates. As such, some embodiments provide for continuous adjustments of the bit rates to better maximize signal reception. In some embodiments, the bit rate can be changed once every frame, once every other frame, or other similar periods to simplify the implementation and reduce potentially rapid bit rate changes. Additionally, some embodiments determine if the change in bandwidth exceeds a changed bandwidth threshold before initiating a change in the bit rate. This can reduce rapid changes in bit rates and can avoid bit rate changes when minor changes will have minimal effect. Similarly, a hysteresis can be employed to reduce the rapid shifting of the encoding bit rate.

Further, the present embodiments provide for the variation in a defined encoding envelope. An encoding envelope can be defined with a maximum encoding rate and a minimum encoding rate according to the determined available bandwidth. This envelope allows the encoders some leeway to make minor adjustments within the defined encoding envelope to better optimize signal quality. Alternatively, some previous systems, such as MPEG systems, allow for an encoding envelope to be defined, however, these envelopes were fixed. The bit rate may be minimally varied within the limited and fixed envelope, where the maximum and minimum bit rates are set. The encoder would operate within those fixed limits and the maximum and minimum encoding rates do not change.

The present embodiments, however, provide for the dynamic adjustment of the encoding envelope. The maximum and/or minimum encoding rates can be adjusted up or down depending on the detected available bandwidth. The encoder can encode within the encoding range while the range is potentially changed according to the detected bandwidth fluctuations.

Some prior encoders are designed to allow multiple passes and/or analysis of data to be encoded. This allows these encoders to see how the data is going to vary. With the knowledge of how things are going to vary, these encoders can optimize the bit budgeting and employ complex encoding. These encoders cannot operate in real-time systems. Real-time encoding cannot utilize such encoding schemes because there is not enough time to perform the processing to allow for multiple passes.

The present embodiments can be employed in real-time video streaming without the need to perform multiple passes of the data. These embodiments alternatively vary the bit rate on the fly to better optimize the encoding of real-time data signals to be wirelessly communicated to one or more remote devices.

Some wireless communication schemes, such as 802.11, allow for the retransmission of data to a receiving device upon the detection of errors in received signals. When a receiving device detects an error in a frame, the receiving device submits a request for retransmission of at least the frame in question. Real-time streaming video does not have the time to allow for retransmission. With real-time streaming video and/or audio, by the time errors are detected and retransmission is requested, the multi-media data has progressed and data that might have been retransmitted would no longer be current and could not be utilized. For example with video signals, by the time an error at the receiving device detects an error and requests for retransmission, the video data would have progressed to a new scene and the retransmitted data could not be displayed without corrupting the current frame. As such, the accurate communication of the multi-media data is critical to multi-media distribution systems. The present embodiments provide the capability to better maximize the use of available bandwidth by dynamically adjusting bit rates to better ensure the accuracy of the data received by receiving devices with real-time data communications.

Figure 3:
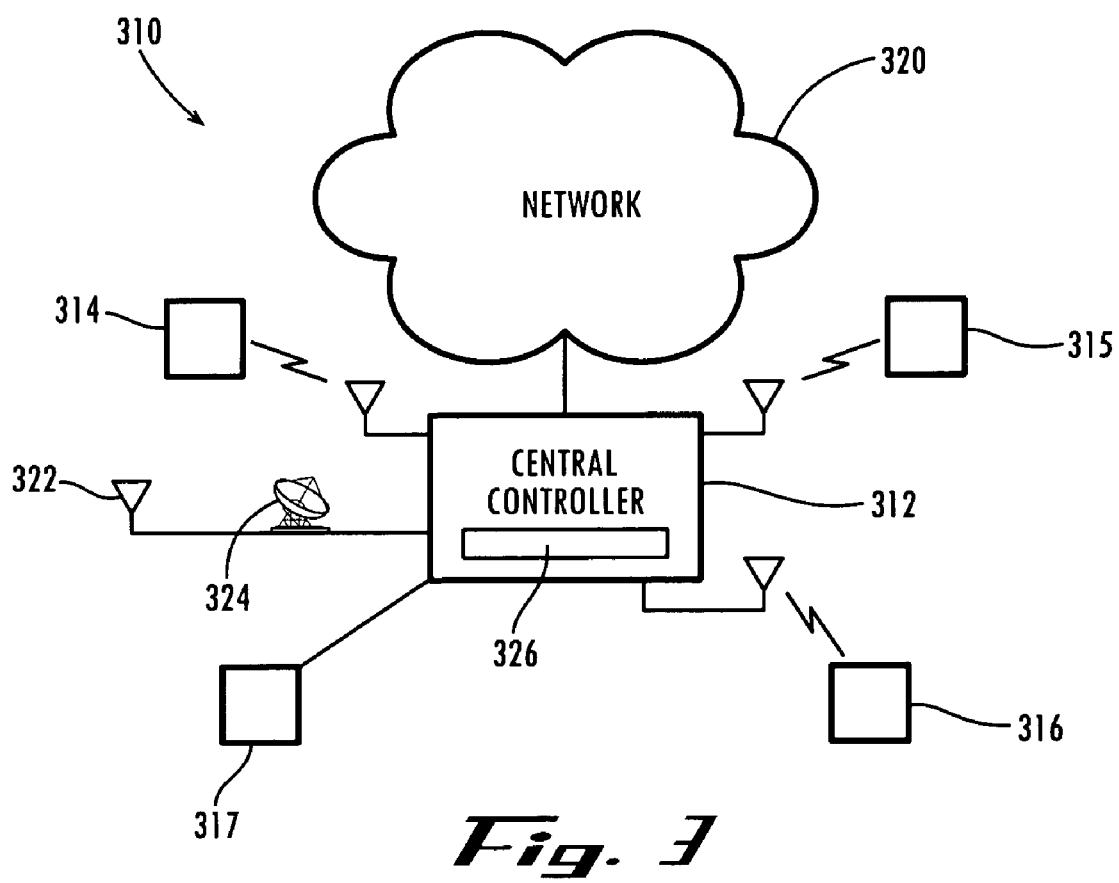
FIG. 3 depicts a simplified block diagram of a distributed, wireless communication system according to one embodiment.

FIG. 3 depicts a simplified block diagram of a distributed, wireless communication system 310 according to one embodiment. The communication system 310 can be utilized, for example, as an in-home, wireless, multi-media distribution system that accesses local or remote multi-media data (such as cable TV, satellite TV, pay-per-view movies, Internet data/audio/video, movie DVDs, music CDs, software, electronic games and other similar multi-media data) and wired or wirelessly distributes the data to remote devices 314–317 allowing one or more users to access the data. The system 310 includes a central controller 312 that accesses and distributes the data. For example, the central control can be a computer, a processor, a server, a set-top-box or other similar devices or combination of devices that can configured to receive and distribute multi-media data.

In some embodiments, the central controller 312 can couple with one or more external networks 320 to receive and/or retrieve data from the network. The network can be a cable TV network, a terrestrial communication network, the Internet, a PSTN network, a combination of networks and/or other similar networks from which data can be received and/or retrieved. In some embodiments, the central controller can further communicate data to the network and/or other devices coupled with the network 320. The central controller can additionally couple with other devices for receiving data, such as an antenna 322 and satellite dish 324. The central controller can additionally include memory 326, such RAM, ROM, CD/DVD drive player and other similar memory. The memory can store data and/or content received by the controller, and can prerecord data for access by the controller (e.g., a movie stored on a DVD, music stored on a CD and the like).

The central controller can, in some embodiments, be part of another system, such as a set-top-box, an entertainment center, a computer, a processor, a server, combination of devices, or other devices that can transmit/receive data to/from a network, terrestrial or other sources. Alternatively and/or additionally, the central controller 312 can be directly coupled through hard wiring with a computer for receiving and/or delivering data. Similarly, the central controller can be hard wired with a multi-media player device such as a CD player, a DVD player, electronic game console (e.g., Sony PlayStation™) and other similar devices.

The communication system 310 further includes the remote devices 314–317. The remote devices allow users to access data stored at other remote devices, data stored or inserted into the controller 312 and/or data accessible by the controller through the network 320, terrestrially through the antenna/satellite or through other means. The remote devices can wirelessly couple with the central controller 312 allowing the remote devices to roam within a predefined range limited by the transmission and reception capability of the controller and/or the remote device. The remote devices can alternatively be directly coupled with the controller to receive and communicate data.

The remote devices can be substantially any device that can receive and/or transmit data from and/or to the controller 312. For example, the remote devices 314–317 can be televisions, computers, electronic game console (e.g., Sony PlayStation™) and other devices that can communicate with the central controller 312.

Figure 4:
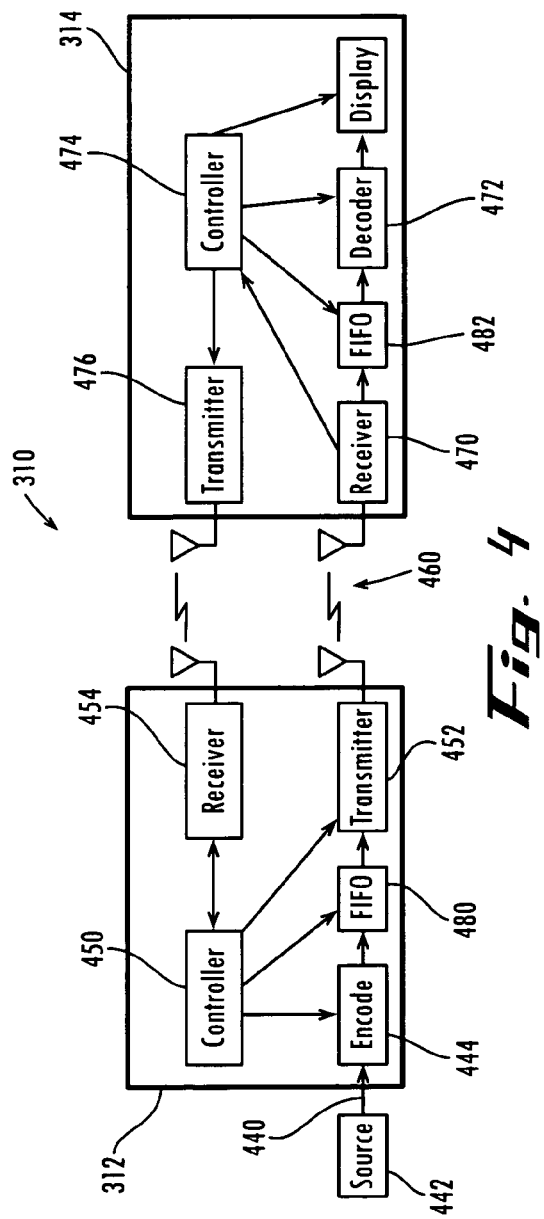
FIG. 4 depicts a simplified block diagram of the system showing only a central controller and a single remote device.

FIG. 4 depicts a simplified block diagram of the system 310 showing only the central controller 312 and a single remote device 314 where the central controller is transmitting data, such as audio and/or video data, to the remote device to be displayed and/or otherwise utilized by the remote device. Referring to FIGS. 3 and 4, one example of an implementation of the system 310 can be when the transmitting central controller 312 and the receiving remote device 314 pair is used in a dedicated and physically constrained environment, such as in a home. The central controller 312 receives one or more audio/video signals 440 from one or more sources 442, such as the network 320, terrestrially through an antenna 322 or satellite dish 324, DVD player, or other such sources. The signal 440 is supplied to an encoder 444. Typically, the signal 440 is demodulated, uncompressed, decoded, checked for accuracy of reception and/or similarly processed as is known in the art, prior to being presented to the encoder 444. Additionally, in some embodiments, the one or more received signals are separated and/or selected to be forwarded to one or more encoders 444.

The encoder 444 encodes the audio/video signal 440 according to predefined parameters defined by a control device 450 and the system 310. Further, the encoder encodes the signal according to a communication bandwidth available over the wireless communication link 460. The source data of the signal 442 is encoded to reduce spatial and temporal redundancies in addition to using other methods to produce compressed data, such as a compressed image, that meets a currently defined bit budget. The encoded signal is forwarded to a transmitter 452 for transmitting the encoded signal over the wireless link 460. In some embodiments, the transmitter additionally wraps the data with error correction codes adding a margin of redundancy that permits correction of isolated bit errors and short burst errors by the receiving remote device 314. The encoded and error corrected data is used to modulate a carrier that is wirelessly transmitted over the wireless link 460. Substantially any modulation scheme can be utilized based upon data density and other similar criteria.

The encoder encodes the data according to a defined bit rate. This defined bit rate is supplied by the control device 450. The bit rate is determined by the control device based on a determined and/or detected available communication bandwidth envelope. Further, the control device 450 dynamically controls and/or adjusts the defined bit rate as the available bandwidth envelope varies. The available bandwidth envelope is determined according to a signal quality of communications received by the controller 312 as well as data supplied by the remote device 314. The defined encoding bit rate can be continuously updated by the central device, and/or the central device can periodically determine and supply a desired encoding bit rate according to available bandwidths. In some embodiments, the control device 450 defines desired encoding bit rates once every frame.

The encoder 444 utilizes the defined encoding bit rate to adjust a rate of encoding to provide encoding of the source signal at the desired bit rate. Again, the encoder can vary the bit rate once every frame, once every predefined number of frames, continuously or other similar variations. In some instances, when the bandwidth is of sufficient width, the control device 450 can instruct the encoder 444 to encode an additional I-frame to provide greater accuracy. Similarly, the control device can also instruct the encoder to produce an I-frame to refresh content after a significant impact of data corruption.

Again, the wireless transfer of the source data occurs in real-time and retransmission is not an option. The encoder 444, control device 450 and/or receiving device 314 can employ masking techniques to minimize display artifacts and/or errors caused by missed or corrupted data. For example, the control device 450 can instruct, and/or a receiving device 314 can determine that a frame be repeated rather than present an image with flawed input. Preferably, the source data is encoded, transmitted, and received to be utilized (e.g., reproduced) with the maximum detail and frame rate possible. Some embodiments provide error compensation by attempting to maintain a smooth presentation and use subtle degradations that, with for example video data, the eye is more likely to overlook. This can include softening details or slowing a refresh rate.

Still referring to FIGS. 3 and 4, the remote device 314 includes a receiver 470 that detects the carrier energy of the wireless signal and can determine a signal strength. In some embodiments, the receiver 470 additionally determines a signal-to-noise ration (SNR) and/or signal-to-interference ratio (SIR). The signal strength and SNR can be forwarded to a control unit 474 of the remote device 314. The received data is demodulated to extract the payload data (e.g., audio and video data). Forward error correction (FEC) codes can be extracted and used to validate the received data and to aid in making minor adjustments. Information about signal strength, SNR, FEC and other signal quality parameters can be forwarded to the receiving control unit 474. The demodulated data stream is forwarded to a decoder 472. The decoder 472 processes the compressed payload and tries to produce the best possible display. Format and other content errors detected and other statistics can be provided to the receiving control unit 474.

The information about signal strength, SNR, FEC, changes in the received signal, processing status and/or other signal quality parameters can be monitored by the receiver control unit 474 and/or communicated back to the central controller 312. Typically, the receiver control unit 474 monitors changes in the received signal and processing status. If the signal quality falls or excessive errors are noted, the control unit can provide this information to a transmitter 476 to be communicated back to the central controller 312. The received signal statistics can be communicated wirelessly, through direct coupling, hardwire couple, through the network 320, or other similar ways of communicating. The central controller utilizes the drop in signal quality and determines an amount of change in available bandwidth.

Knowing the change in bandwidth, the control device 450 of the central controller 312 dynamically reduces the encoding bit rate of the encoder 444 to provide a more accurate signal to the receiving device 314.

Similarly, the receiving device 314 may detect a period of high signal quality with no or minimal errors, indicating that there is the possibility for an increase in bandwidth. This detection of high signal quality is forwarded to the central controller 312 where the central controller can determine the proportional increase in available bandwidth. The central controller 312 can again dynamically adjust the encoding bit rate to better maximize the use of the increased available bandwidth, which typically allows room for more data to be transmitted by the central controller 312, providing a correspondingly better display and audio at the remote device 314. Changes in available bandwidth are usually transitory, which can be caused by environmental noise (e.g., a vacuum cleaner or other appliance being activated), path disruption (e.g., walking between the transmitter and receiver) and other such conditions.

The control device 450 of the central controller 312 utilizes the signal quality and statistical data to determine a current available bandwidth of the wireless link 460. Based on the determined available bandwidth envelope, the control device determines an encoding bit rate that better optimizes the throughput of data to the receiving device. The control device 450 then directs the encoder 444 to dynamically adjust or maintain the encoding bit rate of the signal 440. The dynamic adjustments can be provided at substantially any rate. The rate of adjustments depends in some embodiments on the receiving device's ability to provide the signal quality and/or statistical data. In some embodiments, the bit rate is adjusted once every frame in an attempt to maximize the use of the available bandwidth envelope.

In determining the bit rate, the control device 450 attempts to ensure a predefined signal quality. Typically, the control device 450 establishes or maintains one or more thresholds for certain parameters. For example, the control device can utilize a maximum bit rate. The controller-typically utilizes a maximum bit rate defined by transmitter limitations and/or a receiving device's capability to accurately receive and demodulate the data. Other thresholds can be utilized by the control device 450 to help maintain accurate communication of the data to the receiving device 314.

The control device 450 can further instruct the transmitter 452 to include additional FEC bits, which also affects the available bit rate because the added FEC bits reduces the space available for the payload data. Similarly, the control device 450 can instruct that the modulation scheme be altered to better optimize the bit rate. For example, the modulation scheme may be switched from a 256 QAM modulation scheme to a 64 QAM modulation scheme, and/or from 64 QAM to 256 QAM. Again, this can have an affect on the amount of space available for the payload data.

In changing the amount of payload data per frame, the control device 450 additionally can dynamically varying encoding parameters. In previous wireless communication systems a constant bit rate was generally used such that the encoder uses a fixed number of bits for encoding regardless of the number of changes from frame to frame. The present embodiments employ a more efficient method(s) that provide dynamically varied bit rates. In some embodiments, the control device 450 can specify a target nominal bit rate and a maximum ceiling bit rate for each variation in designated bit rates. Frames that change little from the previous frame can be encoded with few bits while frames with significant changes, such as a new scene in video data, typically use more bits. Some embodiments utilize one or more first-in-first-out devices (FIFO) 480 with the transmitter. A FIFO 482 can additionally be included in the receiving device 314. The FIFO(s) can be used to further smooth transmission rate variations.

The control device 450 can utilize the FIFO 480 for additional control information in determining the dynamic bit rate allocations. In some embodiments, an encoder produces a data stream at a first bit rate of payload transmission and passes that stream to the FIFO. The transmitter takes data from the FIFO at a determined actual transmission rate. When the control device 450 constricts the transmission bit rate (e.g., adds more FEC bits, implements a different modulation, and the like) the FIFO may begin to fill as the transmission bit rate can be less than the rate at which data is forwarded to the FIFO.

The control device couples with the FIFO and can sense when the FIFO is filling. Upon sensing that the FIFO is filling, the controller can instruct the encoder 444 to use fewer bits. Additionally, the control device can anticipate that the FIFO would be filling because the control device issued the instructions to the transmitter to scale back the transmission bandwidth, attempting to make the data transfer more reliable. The control device can additionally instruct the encoder 444 to dynamic adjust the bit rate. As a result, the amount of payload data supplied to the FIFO is reduced.

With the encoding bit rate reduced, the FIFO may begin to empty following an adjustment to increase the transmission rate. As such, the control device 450 can further instruct the encoder to increase the encoding bit rate to use more bits. As described above, in some instances, when the bandwidth is of sufficient width, and the FIFOs are not too full or below a predefined threshold, an additional I-frame can be generated to provide greater accuracy and/or provide data correction. In some preferred embodiments, both transmit and receive FIFOs 480, 482, respectively, operate at an almost empty state to minimize latency. Increased FIFO fill levels can be used to smooth potential data bursts and provide the buffering necessary for drastic changes in modulation methods.

Figure 5:
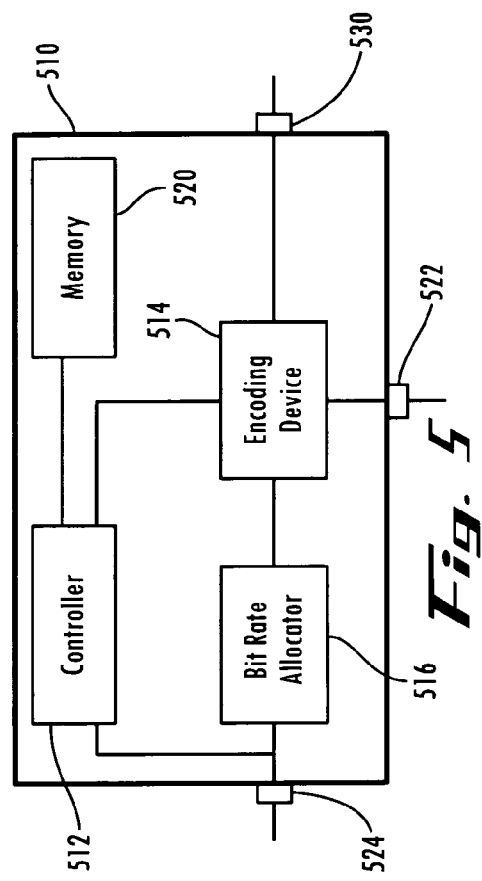
FIG. 5 depicts a simplified block diagram of an encoder according to some embodiments.

FIG. 5 depicts a simplified block diagram of an encoder 510 according to some embodiments. The encoder can include an encoder controller and/or processor 512, an encoding device 514 that encodes one or more source signals, and a bit rate allocator 516 that defines the bit rate at which the encoding device operates. In some embodiments, the encoder 510 includes a memory and/or register 520 for storing programs, processing parameters, a desired bit rate and other similar programs, data and/or parameters.

The encoder 510 includes a source input 522 and a bit rate input 524. The source input couples with a data source 442 (see FIG. 4) to receive source data that is to be encoded. The source data can be substantially any data to be encoded. The bit rate input 524 couples with the control device 450 (see FIG. 3). The control device supplies the desired encoding bit rate to the bit rate input 524. The bit rate input couples with the encoder controller 512 and/or the bit rate allocator 516. The encoder controller or the bit rate allocator can determine a rate at which the encoding device 514 should operate to maximize the encoded bit rate according to the desired bit rate received from the control device 450.

The source input 522 is coupled with the encoding device to deliver the source data. The encoding device receives the source data and encodes the source data according to the defined encoding bit rate as supplied by the bit rate allocator 516. The encoding device generates an encoded output 530 that can be supplied to a FIFO 480 and/or transmitter 452.

Figure 6:
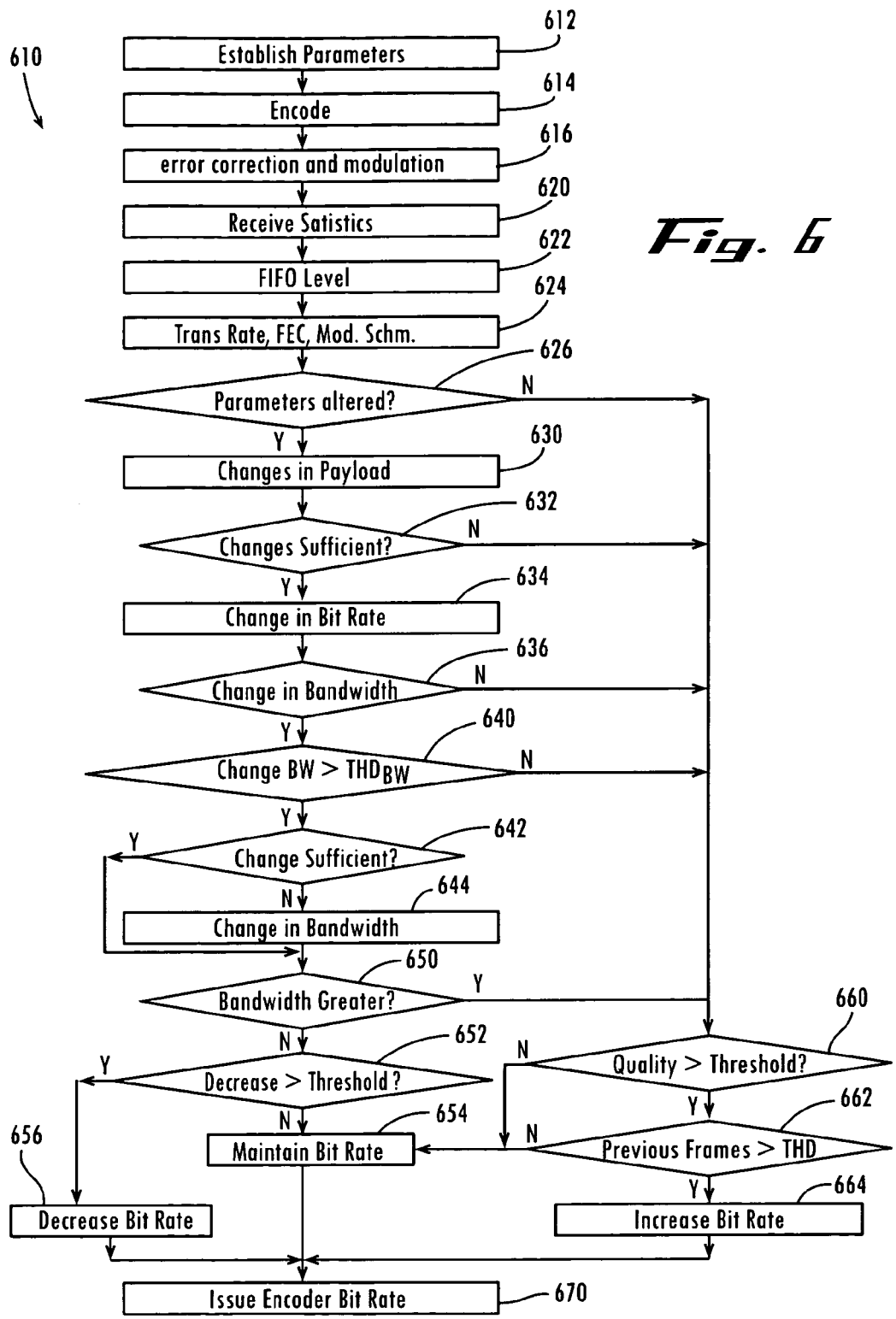
FIG. 6 depicts a simplified flow diagram of a process for providing dynamic bit rate encoding according to some embodiments.

FIG. 6 depicts a simplified flow diagram of a process 610 for providing dynamic bit rate encoding according to some embodiments. In step 612, initial parameters are established by the controller 312. The initial parameters can include an encoding bit rate, a transmission bit rate, a modulation scheme, desired bit budget and other similar parameters. The parameters can be determined by the controller based on default parameters and/or by previous operations and condition for wireless distribution of the data. In step 614, uncompressed source data (e.g. 720*480 pixels, 30 fps, 10 bits per pixel) is encoded and transmission begun according to the initial parameters. The encoding reduces or eliminates spatial and temporal redundancies. In some embodiments, addition methods can be to produce a compressed image that fits into the desired bit budget.

In step 616, a carrier signal is modulated by the encoded data signal according to a predefined modulation scheme. In some embodiments, the encoded bit stream can also be wrapped with error correction codes that add a margin of redundancy that permit correction of isolated bit and short burst errors by the receiver prior to modulation. As such, step 616 can provide error correction coding and modulate the carrier signal by the encoded, compressed and forward error correction (FEC) wrapped data according to the predefined modulation scheme for transmission over a wireless link, physical link (e.g., twisted pair, fiber optic, coaxial and the like), other links or a combinations thereof. Substantially any modulation scheme can be used depending on the data density.

In step 620, signal statistics are received from a remote device regarding the signal quality as received by the remote device. The statistics can include signal strength, signal-to-noise ratio (SNR), corrections based on forward error correction (FEC), format and other content errors, and substantially any other signal quality parameters. In some embodiments, the statistics are only received when a signal quality falls below a quality threshold, when excessive errors are noted and other situations. Alternatively, the remote receiving device may simply signal the controller 312 when the signal quality drops below the quality threshold. Additionally, the statistics can be provided to the controller 312 when high or good signal quality is detected. For example, the good statistics may be provided following a period of high signal quality with a minimal or no errors indicating that there is room for additional data, which can provide a correspondingly better display and/or sound.

Some embodiments include a FIFO following the encoder (see FIG. 4). The encoded signal is buffered, for example by the FIFO, and retrieved from the buffer/FIFO by the transmitter according to the transmission rate. Still referring to FIG. 6, in step 622, a fill level statistic of a FIFO can be checked and additionally utilized in determining a desired transmission and/or encoding rate.

In step 624, it is determined if the transmission rate should and/or can be altered based on the statistics, if the number if FEC bits should be altered, and the modulation scheme should and/or can be altered. If it is determined that the transmission rate is to be altered it is further determined by how much the transmission rate is adjusted. Similarly, if it is determined that the number of FEC bits should be altered, the change in the amount of FEC bits used is also determined. For example, it is determined if additional FEC bits should be utilized to improve signal accuracy and the number of bits to be added. One example of a change in the modulation scheme can be made by changing from 256 QAM to 64 QAM. Other similar steps can be included to better optimize the transmission and eventual reception of the data signal(s). The alteration of the FEC bits and/or modulation scheme (and/or other parameters) reduces the space available for payload data in the transmission.

In step 626, it is determined if transmission parameters were altered. If transmission parameters were not altered, the process continues to step 660. If transmission parameters were altered, step 630 is entered where the changes in the amount of payload are determined. In step 632, it is determined if the change in payload is sufficient to cause a need for adjustments to the encoding bit rate. If changes are needed, step 634 is entered where an amount of change in the encoder bit rate is determined based on the changes of the amount of payload. If changes to the encoder bit rate are not needed due to the altered transmission parameters, the process continues to step 660.

In step 636, the statistical data, FIFO fill levels and/or signal quality are evaluated to determine if the bandwidth has changed from a previous bandwidth determination (e.g., the bandwidth determined in a previous frame). If the bandwidth has not changed, the process proceeds to step 660. If the bandwidth has changed, step 640 is entered where it is determined if the change in bandwidth exceeds a predefined change in bandwidth threshold ($THD_{BW}$). If the change does not exceed the threshold, the process proceeds to step 660. If the change in bandwidth does exceed the change in bandwidth threshold, the process continues to step 642 where it is determined if the changed encoder bit rate determined in step 634 due to transmission changes and/or signal quality is sufficient to compensate for the change in bandwidth. If the change is sufficient the process 610 continues to step 650. If the change is not sufficient, step 644 is entered where a change is the bandwidth is determined.

In step 650 it is determined if the bandwidth is greater than or equal to a previous bandwidth and/or greater than or equal to a bandwidth threshold. If the bandwidth is not greater than or equal to the previous bandwidth and/or the bandwidth threshold, step 652 is entered where it is determined if a decrease in bandwidth is greater than a decrease bandwidth threshold. If a change in bandwidth does not exceed the decreased bandwidth threshold the process proceeds to step 654 where the bit rate is maintained at previously defined level. If it is determined in step 652 that a decreased change in bandwidth is greater than the decrease bandwidth threshold, step 656 is entered where a decreased encoder bit rate is determined according to the determined bandwidth.

If it is determined in step 650 that the bandwidth is greater than or equal to the previous bandwidth and/or the bandwidth threshold, the process continues to step 660 where it is determined if the signal quality exceeds a signal quality threshold. If the signal quality does not exceed the threshold, the process returns to step 654 to maintain the bit rate. If the signal quality is found to be greater than the signal quality threshold, step 662 is entered where it is determined if the signal quality for a predefined number of previous frames have also exceeded the signal quality threshold. If the signal qualities of the predefined number of frames have exceeded the threshold, step 664 is entered where the encoding bit rate is increased according to the determined bandwidth. If the signal quality of the predefined number of frames do not exceeded the threshold, the process returns to step 654 where the bit rate is maintained.

Following steps 654, 656 and 664, the process 610 continues to step 670 where the determined encoder bit rate is issued to an encoder where the encoder continues to encode the source signal by the determined encoding bit rate. In some embodiments, the determined bit rate is defined by a bit rate range with a target nominal bit rate and a maximum ceiling bit rate.

Figure 7:
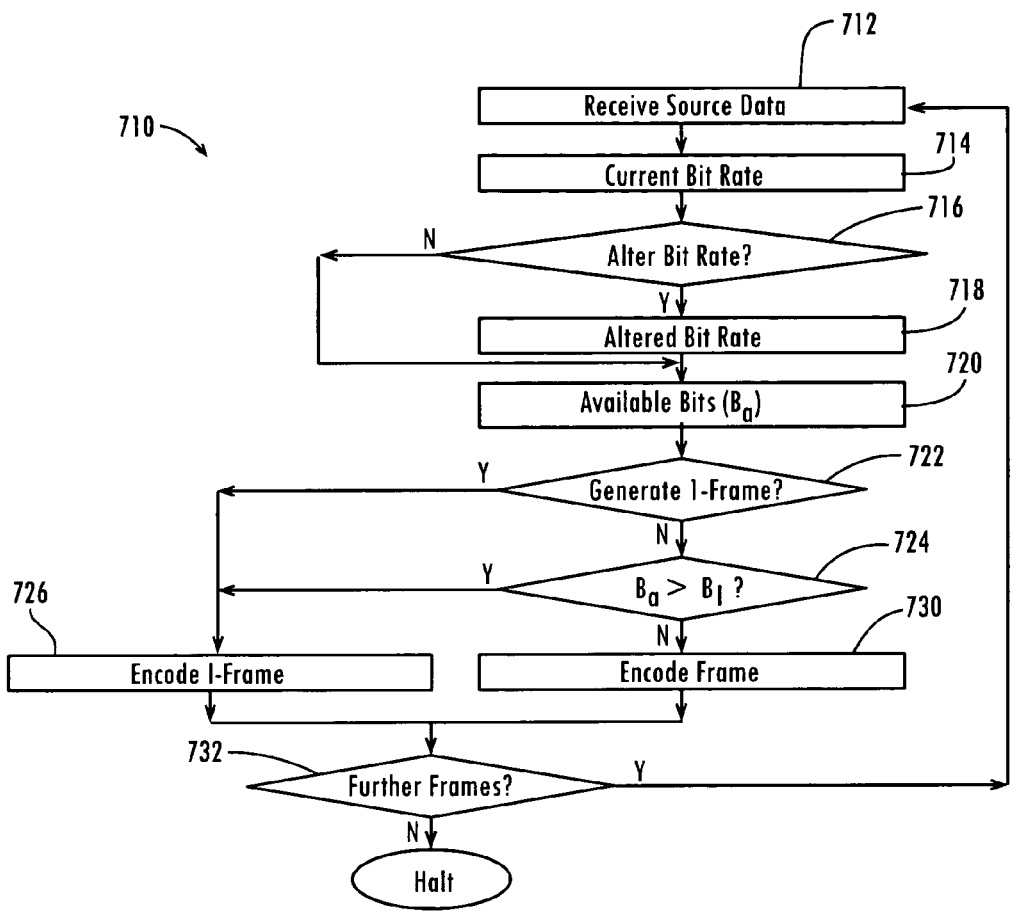
FIG. 7 depicts a simplified flow diagram of a process for dynamically adjusting an encoder bit rate.

FIG. 7 depicts a simplified flow diagram of a process 710 for dynamically adjusting an encoder bit rate. In step 712, a frame of source data is received. In step 714 a current encoding bit rate is determined. In step 716, it is determined if an alternate bit rate is needed. The desired encoding bit rate can be determined as described above based on the determined available bandwidth. If the bit rate is not to be altered, the process proceeds to step 720.

If the bit rate is to be changed, the process 710 continues to step 718 where an altered bit rate is retrieved and set. In step 720, the number of available bits is determined according to the encoding bit rate as defined in step 716 or 718. In step 722 it is determined if an I-frame needs to be generated. An I-frame may be generated to refresh content after a significant impact of data corruption, if a predefined number of frames have been generated, if predefined changes in source data are detected (for example, a change from one scene to another in a video signal) and the like. If an I-frame does need to be generated, the process continues to step 726 where the subject frame is encoded at the desired encoding bit rate as an I-frame. The encoded bit rate (whether adjusted or not) is sufficient to provide for the I-frame. In some embodiments, the process determines of the bit rate needs to be adjusted to provide for the I-frame. In such an instance, the process requests a bit rate adjustment and can return to step 718 to receive and set an adjusted bit rate.

If it is determined in step 722 that an I-frame does not need to be generated, step 724 is entered where it is determined if the available bits $B_a$ exceed a defined number of bits needed to generate an I-frame $B_f$. If the available bits exceed the number of bits for an I-frame, step 726 is entered where the frame is encoded at the desired bit rate as an I-frame. Alternatively, if the available bits are not sufficient to encode as an I-frame, the process continues to step 730 where the frame is encoded according to the desired bit rate as defined in steps 716 or 718. In step 732, it is determined if further frames are to be encoded. If there are additional frames, the process 710 returns to step 712. If there are not, the process is halted until additional frames are received.

In some embodiments, the process 710 is implemented in an encoder. The encoder itself might check its register and/or memory for changes in desired bit rate at the beginning of every frame. This would permit a change, for example, every 33 ms when processing 30 frames-per-second data. Parameters specific internal algorithm would be adjusted to correspond to the desired rate. Some considerations may additionally be provided to accommodate those situations where the change occurs within a group of pictures (GOP) structure. Additionally and/or alternatively, some embodiments change the bit rate by adjusting the GOP structure.

While the invention herein disclosed has been described by means of specific embodiments and applications thereof, numerous modifications and variations could be made thereto by those skilled in the art without departing from the scope of the invention set forth in the claims.

What is claimed is:

1. A method for use in providing dynamic bit rate encoding, comprising:
   detecting a first available bandwidth;
   determining a first encoder bit rate according to the first available bandwidth;
   encoding a signal at the first encoder bit rate;
   detecting a change in the available bandwidth such that there is a second available bandwidth;
   determining a fill level of a first-in-first-out (FIFO) device through which the encoded signal at the first bit rate;
   determining a second encoder bit rate according to the second available bandwidth and the fill level of the FIFO device; and
   encoding the signal at the second encoder bit rate.

2. The method of claim 1, wherein the encoding the signal encoded at the second encoder bit rate includes encoding a subsequent frame of the signal.

3. The method of claim 2, further comprising:
   wirelessly communicating the signal encoded at the first encoder bit rate in real-time; and
   wirelessly communicating the signal encoded at the second encoder bit rate in real-time.

4. The method of claim 3, further comprising:
   receiving a signal quality statistic from a remote receiving device; and
   wherein the detecting the change in the available bandwidth includes detecting the change based on the signal quality statistic.

5. The method of claim 4, further comprising:
   determining if a signal quality at the receiving device has decreased;
   the detecting the change in the available bandwidth comprises detecting decrease in available bandwidth; and
   the determining the second encoder bit rate comprises decreasing the encoder bit rate such that the second encoder bit rate is less than the first encoder bit rate.

6. The method of claim 4, further comprising:
   determining if a signal quality at the receiving device has increased;
   the detecting the change in the available bandwidth comprises detecting an increase in available bandwidth; and
   the determining the second encoder bit rate comprises increasing the encoder bit rate such that the second encoder bit rate is greater than the first encoder bit rate.

7. The method of claim 3, wherein the detecting the first available bandwidth comprises detecting the first available bandwidth every frame of the signal.

8. The method of claim 1, further comprising:
   changing a modulation scheme; and
   the detecting the change in the available bandwidth comprises determining the available bandwidth according to the changed modulation scheme.

9. The method of claim 1, further comprising:
   altering a forward error correction; and
   the detecting the change in the available bandwidth comprises determining the available bandwidth according to the altered forward error correction.

10. A method for use in providing dynamically varied bit rate encoding, comprising:
    encoding a signal for wireless communication at a first encoding bit rate;
    detecting a first change in an available bandwidth envelope of a communication path;
    determining if the first change in the available bandwidth envelope exceeds a predefined threshold;
    determining an available bandwidth envelope of the first changed available bandwidth envelope;
    determining a second encoding bit rate according to the determined available bandwidth envelope that maintains a signal quality when the first change in the available bandwidth envelope exceeds the predefined threshold;

initiating the encoding of the signal at a subsequent frame with the second bit rate; and determining that the available bandwidth following the initiating of the encoding of the signal at the subsequent frame is sufficient to allow the generation of an additional I-frame, and generating an additional I-frame.

11. The method of claim 10, further comprising:

determining a maximized bit rate that can be communicated within the determined available bandwidth envelope, and wherein the initiating of the encoding comprises initiating the encoding according to the maximized determined bit rate.

12. The method of claim 10, further comprising:

detecting a second change in the available bandwidth envelope;

determining a second available bandwidth envelope according to the second change in the available bandwidth envelope;

determining a third encoding bit rate according to the determined second available bandwidth envelope;

encoding the signal at the third encoding bit rate; and wirelessly communicating the signal encoded at the third encoding bit rate.

13. The method of claim 12, further comprising:

determining once every frame if an adjustment in the encoding bit rate is to be implemented.

14. The method of claim 13, wherein the determining the second encoding bit rate comprises determining the second encoding bit rate such that the second encoding bit rate is less than the first encoding bit rate.

15. The method of claim 10, further comprising:

determining if the available bandwidth envelope exceeds a bandwidth threshold;

determining if the available bandwidth during an immediately preceding frame exceeded the bandwidth threshold; and the determining the second encoding bit rate comprises determining the second encoding bit rate such that the second encoding bit rate is greater than the first encoding bit rate.

16. A wireless, multi-media system, comprising:

a central controller that receives source data and wirelessly distributes at least a portion of the source data, where the central controller comprises:

a dynamic, variable bit rate encoder;

a transmitter coupled with the dynamic bit rate encoder, wherein the transmitter transmits the at least the portion of the source data as encoded by the dynamic bit rate encoder;

a control device coupled with the dynamic bit rate encoder, the control device determines an available bandwidth according to received statistics and determines an encoding bit rate according to the determined available bandwidth; and the control device instructs the dynamic bit rate encoder to encode at the determined encoding bit rate; and a first-in-first-out (FIFO) device coupled with the control device, the dynamic bit rate encoder and the transmitter, wherein the FIFO device receives the source data as encoded by the dynamic bit rate encoder and forwards the source data as encoded by the dynamic bit rate encoder to the transmitter; and the control device monitors a fill level of the FIFO device in determining the encoding bit rate.

17. A wireless, multi-media system, comprising:

a central controller that receives source data and wirelessly distributes at least a portion of the source data, where the central controller comprises:

a dynamic, variable bit rate encoder;

a transmitter coupled with the dynamic bit rate encoder, wherein the transmitter transmits the at least the portion of the source data as encoded by the dynamic bit rate encoder;

a control device coupled with the dynamic bit rate encoder, the control device determines an available bandwidth according to received statistics and determines an encoding bit rate according to the determined available bandwidth;

the control device instructs the dynamic bit rate encoder to encode at the determined encoding bit rate; and a remote device wirelessly coupled with the central controller, wherein the central controller wirelessly distributes the at least the portion of the source data to the remote device encoded at the determined encoding bit rate; and a receiver coupled with the control device, wherein the receiver receives the encoded source data from the central controller and forwards at least one of the statistics to the control device.

* * * * *

UNITED STATES PATENT AND TRADEMARK OFFICE
CERTIFICATE OF CORRECTION

PATENT NO. : 7,016,409 B2 Page 1 of 1
APPLICATION NO. : 10/712696
DATED : March 21, 2006
INVENTOR(S) : Unger It is certified that error appears in the above-identified patent and that said Letters Patent is hereby corrected as shown below:

CLAIMS:

Claim 1, col. 14, line 4 after "encoded signal" insert --is received--.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,016,409 B2 |
| APPLICATION NO. | : 10/712696 |
| DATED | : March 21, 2006 |
| INVENTOR(S) | : Unger |

It is certified that error appears in the above-identified patent and that said Letters Patent is hereby corrected as shown below:

TITLE PAGE:

Under Other Publications, after "Wu" delete "et al," and insert --et al.,--.

Under Abstract, line 1, after "in" delete "for use in".

Signed and Sealed this

Twelfth Day of December, 2006

JON W. DUDAS
*Director of the United States Patent and Trademark Office*